United States Patent
Sawada et al.

(10) Patent No.: US 9,683,095 B2
(45) Date of Patent: Jun. 20, 2017

(54) CROSSLINKED RUBBER, MEMBER FOR TIRES, VIBRATION-PROOFING MEMBER, MEMBER FOR BELTS, AND RUBBER COMPOSITION

(71) Applicant: JSR CORPORATION, Minato-ku (JP)

(72) Inventors: Yukihiro Sawada, Minato-ku (JP); Hirofumi Senga, Minato-ku (JP); Shigeru Abe, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 15/023,529

(22) PCT Filed: Oct. 29, 2014

(86) PCT No.: PCT/JP2014/078781
§ 371 (c)(1),
(2) Date: Mar. 21, 2016

(87) PCT Pub. No.: WO2015/064646
PCT Pub. Date: May 7, 2015

(65) Prior Publication Data
US 2016/0215127 A1     Jul. 28, 2016

(30) Foreign Application Priority Data
Oct. 31, 2013   (JP) .................................. 2013-227214

(51) Int. Cl.
| | | |
|---|---|---|
| C08L 9/00 | (2006.01) | |
| C08L 9/06 | (2006.01) | |
| B60C 1/00 | (2006.01) | |
| C08C 19/22 | (2006.01) | |
| C08C 19/25 | (2006.01) | |
| C08C 19/44 | (2006.01) | |
| C08L 15/00 | (2006.01) | |

(52) U.S. Cl.
CPC ...... *C08L 9/06* (2013.01); *B60C 1/00* (2013.01); *C08C 19/22* (2013.01); *C08C 19/25* (2013.01); *C08C 19/44* (2013.01); *C08L 15/00* (2013.01)

(58) Field of Classification Search
CPC ... C08L 15/00; C08L 9/06; B60C 1/00; C08C 19/22; C08C 19/25; C08C 19/44
See application file for complete search history.

(56) References Cited

U.S. PATENT DOCUMENTS

| 4,501,857 | A | 2/1985 | Kishimoto et al. |
|---|---|---|---|
| 4,616,069 | A | 10/1986 | Watanabe et al. |
| 4,673,714 | A | 6/1987 | Kishimoto et al. |
| 2001/0053813 | A1 | 12/2001 | Konno et al. |
| 2002/0007011 | A1 | 1/2002 | Konno et al. |
| 2004/0152844 | A1 | 8/2004 | Konno et al. |
| 2010/0130669 | A1 | 5/2010 | Higuchi et al. |
| 2014/0371383 | A1 | 12/2014 | Hayata et al. |

FOREIGN PATENT DOCUMENTS

| CN | 101668807 A | 3/2010 |
|---|---|---|
| EP | 2 138 537 A1 | 12/2009 |
| JP | 61-103904 A | 5/1986 |
| JP | 63-4841 B2 | 2/1988 |
| JP | 1-37970 B2 | 8/1989 |
| JP | 2002-12633 A | 1/2002 |
| JP | 2002-20543 A | 1/2002 |
| JP | 2003-183473 A | 7/2003 |
| JP | 2003-301074 A | 10/2003 |
| JP | 2003-301087 A | 10/2003 |
| JP | 2004-83622 A | 3/2004 |
| JP | 2007-154014 A | 6/2007 |
| JP | 2011-88998 A | 5/2011 |
| WO | 2009/060931 A | 5/2009 |
| WO | WO 2013/031599 A1 | 3/2013 |

OTHER PUBLICATIONS

International Search Report issued Jan. 13, 2015 in PCT/JP2014/078781 filed on Oct. 29, 2014.
Extended European Search Report issued Sep. 23, 2016 in Patent Application No. 14856857.9.
Combined Chinese Office Action and Search Report issued Dec. 5, 2016 in Patent Application No. 201480059842.2 (with English translation of categories of cited documents).
English translation of Chinese Office Action issued Dec. 5, 2016 in corresponding Chinese Patent Application No. 20140059842.

*Primary Examiner* — Nathan M Nutter
(74) *Attorney, Agent, or Firm* — Oblon, McClelland, Maier & Neustadt, L.L.P.

(57) ABSTRACT

A cross-linked rubber exhibits high strength and excellent abrasion resistance as compared with a known cross-linked rubber. The cross-linked rubber is obtained by cross-linking a rubber composition that includes a hydrogenated conjugated diene-based polymer, an olefin-based rubber, and a cross-linking agent, the hydrogenated conjugated diene-based polymer being a hydrogenated product of a polymer that includes a structural unit derived from butadiene, and including at least one of an amino group and a hydrocarbyloxysilyl group at one terminal or each terminal.

16 Claims, No Drawings

US 9,683,095 B2

CROSSLINKED RUBBER, MEMBER FOR TIRES, VIBRATION-PROOFING MEMBER, MEMBER FOR BELTS, AND RUBBER COMPOSITION

TECHNICAL FIELD

The present invention relates to a cross-linked rubber, a tire member, a vibration-proofing member, a belt member, and a rubber composition.

BACKGROUND ART

An improvement in low fuel consumption performance has been desired for a pneumatic tire, and a terminal-modified diene-based rubber has been developed in order to meet such a demand (see Patent Literature 1). A terminal-modified diene-based rubber has good compatibility with a filler (reinforcing agent) (e.g., carbon black and silica) as compared with an unmodified diene-based rubber, and can improve the low fuel consumption performance by reducing the generation of heat.

The environmental load can also be reduced by increasing the lifetime of a tire while improving the low fuel consumption performance, and a material that exhibits excellent abrasion resistance has been desired.

CITATION LIST

Patent Literature

Patent Literature 1: JP-A-61-103904

SUMMARY OF INVENTION

Technical Problem

The invention was conceived in view of the above situation. An object of the invention is to provide a cross-linked rubber that exhibits high strength and excellent abrasion resistance as compared with a known cross-linked rubber.

Solution to Problem

The inventors of the invention conducted extensive studies in order to solve the above problems. As a result, the inventors found that the above problems can be solved by cross-linking a rubber composition that includes a hydrogenated conjugated diene-based polymer, an olefin-based rubber, and a cross-linking agent, the hydrogenated conjugated diene-based polymer being a hydrogenated product of a polymer that is obtained by polymerizing a monomer including butadiene, and includes at least one of an amino group and a hydrocarbyloxysilyl group at one terminal or each terminal. This finding has led to the completion of the invention. Several aspects of the invention provide the following cross-linked rubber, tire member, vibration-proofing member, and rubber composition.

Advantageous Effects of Invention

According to one aspect of the invention, a cross-linked rubber that exhibits high strength and excellent abrasion resistance (low abrasion properties) can be obtained by utilizing the rubber composition that includes the terminal-modified hydrogenated conjugated diene-based polymer, the olefin-based rubber, and the cross-linking agent.

DESCRIPTION OF EMBODIMENTS

The embodiments of the invention are described in detail below.

Hydrogenated Conjugated Diene-based Polymer

A hydrogenated conjugated diene-based polymer according to one embodiment of the invention may be produced using a method that includes a step that polymerizes a monomer that includes butadiene to obtain a conjugated diene-based polymer (unhydrogenated conjugated diene-based polymer) having an active terminal (polymerization step), a step that modifies the terminal of the resulting conjugated diene-based polymer (modification step), and a step that hydrogenates the conjugated diene-based polymer (hydrogenation step).

Polymerization Step

The unhydrogenated conjugated diene-based polymer that is used to produce the hydrogenated conjugated diene-based polymer according to one embodiment of the invention is a polymer that includes a structural unit derived from butadiene, and preferably a polymer that includes the structural unit derived from butadiene and a structural unit derived from an aromatic vinyl compound.

In the polymerization step, a monomer that includes a conjugated diene compound (preferably a monomer that includes the conjugated diene compound and an aromatic vinyl compound) is polymerized to obtain the conjugated diene-based polymer having an active terminal.

1,3-Butadiene (essential component) is used as the conjugated diene compound subjected to polymerization. Note that a conjugated diene compound other than 1,3-butadiene may also be used as the conjugated diene compound subjected to polymerization. The conjugated diene compound other than 1,3-butadiene is not particularly limited as long as it is copolymerizable with 1,3-butadiene and the aromatic vinyl compound. Examples of the conjugated diene compound other than 1,3-butadiene include isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, 2-chloro-1,3-butadiene, and the like. Among these, isoprene is preferable as the conjugated diene compound other than 1,3-butadiene. Note that these conjugated diene compounds may be used either alone or in combination.

Examples of the aromatic vinyl compound include styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl) dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinylpyridine, diphenylethylene, a tertiary amino group-containing diphenylethylene such as 1-(4-N,N-dimethylaminophenyl)-1-phenylethylene, and the like. The aromatic vinyl compound is particularly preferably one or more compounds selected from styrene and α-methylstyrene. Note that these aromatic vinyl compounds may be used either alone or in combination.

The conjugated diene-based polymer obtained by the polymerization step may be a homopolymer of 1,3-butadiene, or may be a copolymer of 1,3-butadiene and the aromatic vinyl compound, or may be a copolymer of 1,3-butadiene, the conjugated diene compound other than 1,3-butadiene, and the aromatic vinyl compound. It is preferable that the conjugated diene-based polymer be a copolymer of 1,3-butadiene and styrene since high living properties are obtained during anionic polymerization.

When the conjugated diene-based polymer is a copolymer of the conjugated diene compound and the aromatic vinyl compound, the aromatic vinyl compound is preferably used in a ratio of 10 to 50 mass %, and more preferably 15 to 40 mass %, based on the total amount of the monomer subjected to polymerization, from the viewpoint of improving the low hysteresis loss properties of the resulting cross-linked rubber. When the butadiene content is within the above range, it is possible to achieve satisfactory productivity and strength in combination.

It is preferable that the monomers used to produce the unhydrogenated conjugated diene-based polymer include 50 to 90 parts by mass of butadiene, 10 to 50 parts by mass of the aromatic vinyl compound, and 0 to 40 parts by mass of the conjugated diene compound (conjugated diene-based compound) other than butadiene. In this case, it is possible to achieve satisfactory productivity and strength in combination when producing a cross-linked rubber using a modified hydrogenated conjugated diene-based polymer and an olefin-based rubber.

Note that the conjugated diene compounds and the aromatic vinyl compounds mentioned above have the same effect in that the conjugated diene-based polymer having an active terminal can be obtained. Therefore, specific compounds that are not used in the examples described later can also be used in connection with the invention.

An additional monomer other than the conjugated diene compound and the aromatic vinyl compound may also be polymerized. Examples of the additional monomer include acrylonitrile, methyl (meth)acrylate, ethyl (meth)acrylate, hydroxyethyl (meth)acrylate, and the like. The additional monomer is preferably used in a ratio of 40 mass % or less, more preferably 30 mass % or less, and still more preferably 20 mass % or less, based on the total amount of the monomers used for polymerization.

The conjugated diene-based polymer used in connection with the embodiments of the invention may be produced by polymerizing butadiene optionally together with the aromatic vinyl compound, a conjugated diene compound other than butadiene, and the additional monomer. The monomer(s) may be polymerized using a solution polymerization method, a vapor-phase polymerization method, or a bulk polymerization method. Among these, a solution polymerization method is particularly preferable. The monomer(s) may be polymerized in either a batchwise manner or a continuous manner.

When using a solution polymerization method, the monomer(s) including the conjugated diene compound may be polymerized in an organic solvent in the presence of an initiator and an optional randomizer, for example.

At least either an alkali metal compound or an alkaline-earth metal compound may be used as the initiator. An alkali metal compound and an alkaline-earth metal compound that are normally used as an anionic polymerization initiator may be used as the alkali metal compound and the alkaline-earth metal compound. Examples of the alkali metal compound and the alkaline-earth metal compound include an alkyl-lithium such as methyllithium, ethyllithium, n-propyl-lithium, n-butyllithium, sec-butyllithium, and t-butyl-lithium, 1,4-dilithiobutane, phenyllithium, stilbenelithium, naphthyllithium, naphthylsodium, naphthylpotassium, di-n-butylmagnesium, di-n-hexylmagnesium, ethoxypotassium, calcium stearate, and the like. It is preferable to use a lithium compound.

The polymerization reaction may be effected in the presence of a compound (R) that is obtained by mixing at least either the alkali metal compound or the alkaline-earth metal compound with a compound (B1) that includes a functional group that interacts with silica. A functional group that interacts with silica can be introduced into the polymerization-initiation terminal of the conjugated diene-based polymer by effecting polymerization in the presence of the compound (R). Note that the term "interaction" used herein means that a covalent bond is formed between molecules, or an intermolecular force (intermolecular electromagnetic force such as ion-dipole interaction, dipole-dipole interaction, a hydrogen bond, or van der Waals force) that is weaker than a covalent bond is formed. The term "functional group that interacts with silica" used herein refers to a group that includes at least one atom (e.g., nitrogen atom, sulfur atom, phosphorus atom, or oxygen atom) that interacts with silica.

The compound (R) is preferably a reaction product of a lithium compound (e.g., alkyllithium) and a nitrogen-containing compound (e.g., a secondary amine compound). Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, 1,3-ditrimethylsilyl-1,3,5-triazinane, and the like. When effecting polymerization in the presence of the compound (R), the compound (R) may be prepared by mixing the alkali metal compound or the alkaline-earth metal compound with the compound (B1), and added to the polymerization system, and polymerization may then be effected. Alternatively, the alkali metal compound or the alkaline-earth metal compound and the compound (B1) may be added to the polymerization system, and mixed within the polymerization system to prepare the compound (R), and polymerization may then be effected.

The randomizer may be used to adjust the content (vinyl content) of vinyl bonds (1,2-bond and 3,4-bond), for example. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, tetramethylethylenediamine, and the like. These randomizers may be used either alone or in combination.

The organic solvent used for polymerization may be an organic solvent that is inert to the reaction. Examples of the organic solvent used for polymerization include an aliphatic hydrocarbon, an alicyclic hydrocarbon, an aromatic hydrocarbon, and the like. It is preferable to use a hydrocarbon having 3 to 8 carbon atoms. Specific examples of the hydrocarbon having 3 to 8 carbon atoms include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene, and the like. Note that these organic solvents may be used either alone or in combination.

When using a solution polymerization method, the monomer concentration in the reaction solvent is preferably 5 to 50 mass %, and more preferably 10 to 30 mass %, from the viewpoint of maintaining the balance between productivity and polymerization controllability. The polymerization reaction temperature is preferably −20 to 150° C., more preferably 0 to 120° C., and particularly preferably 20 to 100° C. It is preferable to effect the polymerization reaction under a pressure sufficient to substantially maintain the monomer(s) in a liquid phase. Such a pressure may be achieved by pressurizing the reactor using a gas that is inert to the polymerization reaction, for example.

The conjugated diene-based polymer having an active terminal can thus be obtained. The weight average molecular weight (Mw) of the conjugated diene-based polymer is preferably $1.0 \times 10^5$ to $2.0 \times 10^6$. If the weight average molecular weight (Mw) of the conjugated diene-based polymer is less than $1.0 \times 10^5$, deterioration in the abrasion resistance of the resulting cross-linked rubber, and deterioration in the low fuel consumption performance when the cross-linked rubber is used for a tire may occur. If the weight average molecular weight (Mw) of the conjugated diene-based polymer exceeds $2.0 \times 10^6$, deterioration in processability may occur. The weight average molecular weight (Mw) of the conjugated diene-based polymer is more preferably $1.5 \times 10^5$ to $1.5 \times 10^6$, and still more preferably $1.7 \times 10^5$ to $1.0 \times 10^6$.

The 1,2-vinyl content in the structural unit derived from butadiene is preferably 5 to 70 mass %, more preferably 10 to 60 mass %, and still more preferably 25 to 50 mass %. If the 1,2-vinyl content is less than 5 mass %, the grip properties may decrease to a large extent. If the 1,2-vinyl content exceeds 70 mass %, deterioration in abrasion resistance may occur. Note that the term "vinyl content" used herein refers to a value determined by $^1$H-NMR.

The conjugated diene-based polymer obtained by the polymerization step may include a polyisoprene block. When the conjugated diene-based polymer includes a polyisoprene block, it is possible to efficiently vulcanize a polymer having a high hydrogenation rate. The position of the polyisoprene block in the conjugated diene-based polymer is not particularly limited. It is preferable that the conjugated diene-based polymer include the polyisoprene block at one terminal or each terminal. The 1,4-bond/3,4-bond ratio in the polyisoprene block is preferably 60/40 to 98/2. When the 1,4-bond/3,4-bond ratio is within the above range, it is possible to obtain a flexible cross-linked rubber while achieving satisfactory cross-linking efficiency.

It is preferable that the unhydrogenated conjugated diene-based polymer that is used to produce the hydrogenated conjugated diene-based polymer according to one embodiment of the invention include a random copolymer part that is formed of the structural unit derived from butadiene and the structural unit derived from the aromatic vinyl compound. When the unhydrogenated conjugated diene-based polymer includes such a specific random copolymer part, it is possible to improve the dispersibility of a filler. More specifically, it is preferable that the content of a chain that is composed of eight or more consecutive structural units derived from the aromatic vinyl compound in the unhydrogenated conjugated diene-based polymer and the hydrogenated conjugated diene-based polymer be 10 mass % or less based on the total content of the structural units derived from the aromatic vinyl compound, from the viewpoint of advantageously improving the dispersibility of a filler. The above content is more preferably 8 mass % or less, and still more preferably 5 mass % or less.

Note that the content of a chain that includes eight or more consecutive structural units derived from the aromatic vinyl compound in the conjugated diene-based polymer may be determined by calculating the ratio of the integral value within the chemical shift range (a) to the sum of the integral values respectively within the chemical shift ranges (a) to (c) (see below) in the $^1$H-NMR spectrum of the unhydrogenated conjugated diene-based polymer or the hydrogenated conjugated diene-based polymer diene polymer measured using deuterated chloroform as a solvent. For example, when styrene is used as the aromatic vinyl compound, the ratio of the integral value within the chemical shift range (a) to the sum of the integral values respectively within the chemical shift ranges (a) to (c) is calculated, and multiplied by 2.5 to determine the ratio of styrene. The state of a chain that includes the structural units derived from the aromatic vinyl compound can thus be determined.

(a) Chain that includes eight or more consecutive structural units derived from aromatic vinyl compound: $6.00 \leq S \leq 6.68$
(b) Chain that includes 2 to 7 consecutive structural units derived from aromatic vinyl compound: $6.68 \leq S \leq 6.89$
(c) Short chain derived from aromatic vinyl compound: $6.89 \leq S \leq 8.00$ Modification Step In the modification step, the active terminal of the conjugated diene-based polymer obtained by the polymerization step is reacted with a compound (B2) that includes a functional group that interacts with silica. A functional group that interacts with silica can be introduced into the polymerization-end terminal of the conjugated diene-based polymer by performing the modification step. Note that the term "active terminal" used herein refers to a part that is present at the terminal of a molecular chain and excludes a structure derived from a monomer that includes a carbon-carbon double bond.

The polymerization-initiation terminal of the conjugated diene-based polymer that is subjected to the modification reaction (hereinafter may be referred to as "terminal modification reaction") that is effected in the modification step may be either unmodified or modified as long as the conjugated diene-based polymer has the active terminal. The compound (B2) is not particularly limited as long as the compound (B2) is a compound that can introduce at least one of an amino group and a hydrocarbyloxysilyl group at the polymerization-end terminal, and can react with the polymerization active terminal. Specific examples of a preferable compound (B2) include a compound (B2-1) represented by the following formula (1), and the like.

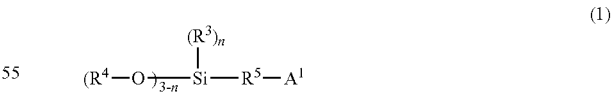

(1)

wherein $A^1$ is a monovalent functional group that includes a nitrogen atom, does not include active hydrogen, and is bonded to $R^5$ through the nitrogen atom, $R^3$ and $R^4$ are a hydrocarbyl group, $R^5$ is a hydrocarbylene group, and n is an integer from 0 to 2, provided that a plurality of $R^3$ are either identical or different when a plurality of $R^3$ are present, and a plurality of $R^4$ are either identical or different when a plurality of $R^4$ are present.

The hydrocarbyl group represented by $R^3$ and $R^4$ in the formula (1) is preferably a linear or branched alkyl group having 1 to 20 carbon atoms, a cycloalkyl group having 3 to 20 carbon atoms, or an aryl group having 6 to 20 carbon atoms.

$R^5$ is preferably a linear or branched alkanediyl group having 1 to 20 carbon atoms, a cycloalkylene group having 3 to 20 carbon atoms, or an arylene group having 6 to 20 carbon atoms.

It is preferable that n be 0 or 1 from the viewpoint of improving the reactivity with the conjugated diene-based polymer.

$A^1$ includes at least one atom selected from the group consisting of a nitrogen atom, a phosphorus atom, and a sulfur atom (hereinafter may be referred to as "specific atom"), and is bonded to $R^5$ through the specific atom. The specific atom is not bonded to active hydrogen. The specific atom is preferably protected by a protecting group such as a trisubstituted hydrocarbylsilyl group, for example. Note that the term "active hydrogen" used herein refers to a hydrogen atom that is bonded to an atom other than a carbon atom, and preferably refers to a hydrogen atom that has a bonding energy lower than that of the carbon-hydrogen bond of polymethylene. The term "protecting group" used herein in connection with $A^1$ refers to a functional group that converts $A^1$ into a functional group that is inert to the polymerization active terminal.

$A^1$ may be a group that may produce an onium ion due to an onium salt generator. When the compound (B2) includes such a group ($A^1$), it is possible to provide the modified conjugated diene-based polymer with an excellent shape retention capability.

Specific examples of $A^1$ include a nitrogen-containing group in which two hydrogen atoms of a primary amino group are substituted with two protecting groups, a nitrogen-containing group in which one hydrogen atom of a secondary amino group is substituted with one protecting group, a tertiary amino group, an imino group, a pyridyl group, a phosphorus-containing group in which two hydrogen atoms of a primary phosphino group are substituted with two protecting groups, a phosphorus-containing group in which one hydrogen atom of a secondary phosphino group is substituted with one protecting group, a tertiary phosphino group, a sulfur-containing group in which one hydrogen atom of a thiol group is substituted with one protecting group, and the like. It is preferable that $A^1$ be a group that includes a nitrogen atom from the viewpoint of affinity to silica. It is more preferable that $A^1$ be a nitrogen-containing group in which two hydrogen atoms of a primary amino group are substituted with two protecting groups.

Specific examples of a preferable compound (B2) include N,N-bis(trimethylsilyl)aminopropyltrimethoxysilane, N,N-bis(trimethylsilyl)aminopropyl methyldiethoxysilane, N,N',N'-tris(trimethylsilyl)-N-(2-aminoethyl)-3-aminopropyltriethoxysilane, 3-(4-trimethylsilyl-1-piperazino)propylmethyldimethoxysilane, and the like.

The terminal modification reaction may be effected using a solution reaction, for example. The solution reaction may be effected directly using the solution that includes unreacted monomers after completion of the polymerization reaction effected in the polymerization step, or may be effected after isolating the conjugated diene-based polymer included in the solution, and dissolving the conjugated diene-based polymer in an appropriate solvent (e.g., cyclohexane). The terminal modification reaction may be effected in either a batch-wise manner or a continuous manner. In this case, the compound (B2) may be added using an arbitrary method. For example, the compound (B2) may be added at a time, or may be added stepwise, or may be added continuously.

The amount of the compound (B2) used for the terminal modification reaction may be appropriately determined taking account of the type of compound used for the reaction. The compound (B2) is preferably used in an amount of 0.1 molar equivalents or more, and more preferably 0.3 molar equivalents or more, based on the metal atoms included in the initiator that are involved in the polymerization reaction. When the compound (B2) is used in an amount of 0.1 molar equivalents or more, the modification reaction proceeds sufficiently, and the dispersibility of silica can be advantageously improved.

The terminal modification reaction is normally effected at a temperature equal to the polymerization reaction temperature. The terminal modification reaction is preferably effected at −20 to 150° C., more preferably 0 to 120° C., and particularly preferably 20 to 100° C. If the modification reaction temperature is low, the viscosity of the modified conjugated diene-based polymer may increase. If the modification reaction temperature is high, the polymerization active terminal may be easily inactivated. The modification reaction is preferably effected for 1 minute to 5 hours, and more preferably 2 minutes to 1 hour.

Hydrogenation Reaction

The hydrogenated conjugated diene-based polymer used in connection with the embodiments of the invention is obtained by hydrogenating the modified conjugated diene-based polymer obtained as described above. The hydrogenation reaction may be effected using an arbitrary method under arbitrary conditions as long as a conjugated diene-based polymer having the desired hydrogenation rate can be obtained. Examples of the hydrogenation method include a method that utilizes a catalyst that includes an organometallic compound of titanium as the main component as a hydrogenation catalyst, a method that utilizes a catalyst that includes an organic compound of iron, nickel, or cobalt and an organometallic compound (e.g., alkylaluminum), a method that utilizes an organic complex of an organometallic compound of ruthenium, rhodium, or the like, a method that utilizes a catalyst obtained by causing a metal (e.g., palladium, platinum, ruthenium, cobalt, or nickel) to be supported on a carrier (e.g., carbon, silica, or alumina), and the like. A method that effects hydrogenation under mild conditions (i.e., low pressure and low temperature) using a homogeneous catalyst that includes an organometallic compound of titanium and an optional organometallic compound of lithium, magnesium, or aluminum (see JP-B-63-4841 and JP-B-1-37970) is preferable from the viewpoint of industrial production, and is suitable for the object of the invention since high hydrogenation selectivity with respect to the double bond of butadiene can be achieved.

The modified conjugated diene-based polymer is hydrogenated in a solvent that is inert to the catalyst and can dissolve the conjugated diene-based polymer. An aliphatic hydrocarbon such as n-pentane, n-hexane, and n-octane, an alicyclic hydrocarbon such as cyclohexane and cyclohexane, an aromatic hydrocarbon such as benzene and toluene, an ether such as diethyl ether and tetrahydrofuran, and a mixture that includes them as the main component are preferable as the solvent.

The hydrogenation reaction is normally effected by holding the conjugated diene-based polymer at a given temperature in a hydrogen atmosphere or an inert atmosphere, adding the hydrogenation catalyst to the conjugated diene-based polymer with or without stirring, and introducing hydrogen gas to pressurize the system to a given pressure. The term "inert atmosphere" used herein refers to an atmosphere that does not react with the materials that are subjected to the hydrogenation reaction. Example of the inert atmosphere include helium, neon, argon, and the like. It is not desirable to be present air or oxygen since inactivation of the catalyst may occur due to oxidation. It is not desirable to be present nitrogen since nitrogen may act as a catalyst poison during the hydrogenation reaction, and decrease the hydrogenation activity. It is most preferable to fill the hydrogenation reactor with hydrogen gas.

The hydrogenation reaction process for obtaining the hydrogenated conjugated diene-based polymer may be effected using a batch process, a continuous process, or a combination thereof. When a titanocene diaryl-based compound is used as the hydrogenation catalyst, the titanocene diaryl-based compound may be added directly to the reaction solution, or may be dissolved in an inert organic solvent, and the resulting solution may be added to the reaction solution. A solvent that does not react with the materials that are subjected to the hydrogenation reaction may be used as the inactive organic solvent in which the catalyst is dissolved. It is preferable to use the same solvent as that used for the hydrogenation reaction. The catalyst is added in an amount of 0.02 to 20 mmol per 100 g of the unhydrogenated conjugated diene-based polymer.

It is most preferable to obtain the hydrogenated conjugated diene-based polymer used in connection with the embodiments of the invention by subjecting the unhydrogenated conjugated diene-based polymer to solution polymerization using an organolithium catalyst, and subjecting the resulting polymer solution directly to the subsequent hydrogenation reaction. This method is very useful from the industrial point of view. The hydrogenated conjugated diene-based polymer used in connection with the embodiments of the invention is obtained by removing the solvent from the solution obtained as described above, and isolating the polymer.

It is preferable that the hydrogenated conjugated diene-based polymer according to one embodiment of the invention have a structure in which the hydrogenation rate of the unsaturated bonds of the structure derived from butadiene is 70% or more. When the hydrogenation rate of the unsaturated bonds of the structure derived from butadiene is 70% or more, it is possible to obtain a hydrogenated conjugated diene-based polymer that exhibits high strength. The hydrogenation rate of the unsaturated bonds of the structure derived from butadiene is more preferably 80% or more, and still more preferably 85% or more. Note that the hydrogenation rate may be determined by $^1$H-NMR.

Olefin-based Rubber

An olefin-based rubber used in connection with one embodiment of the invention includes a repeating unit derived from an olefin. A rubber composition according to one embodiment of the invention includes the olefin-based rubber. The olefin-based rubber can improve heat resistance and weatherability as compared with a diene-based rubber (particularly a natural rubber (NR)). An ethylene-α-olefin copolymer may preferably be used as the olefin-based rubber. Note that one type of olefin-based rubber may be used alone, or two or more types of olefin-based rubbers may be used in combination.

An α-olefin having 3 to 12 carbon atoms is normally used as the α-olefin. Examples of the α-olefin include propylene, 1-butene, 1-pentene, 1-hexene, 4-methyl-1-pentene, 1-heptene, 5-methyl-1-hexene, 1-octene, 1-nonene, 5-ethyl-1-hexene, 1-decene, 1-dodecene, 3-methyl-1-butene, and the like. It is preferable to use at least one α-olefin selected from the group consisting of propylene, 1-butene, 1-hexene, and 1-octene. These α-olefins may be used either alone or in combination.

The olefin-based rubber may further include a repeating unit derived from a non-conjugated diene in addition to the repeating unit derived from ethylene and the α-olefin. Note that one type of non-conjugated diene may be used alone, or two or more types of non-conjugated dienes may be used in combination. Examples of the non-conjugated diene include a linear non-cyclic diene such as 1,4-hexadiene, 1,6-hexadiene, and 1,5-hexadiene; a branched non-cyclic diene such as 5-methyl-1,4-hexadiene, 3,7-dimethyl-1,6-octadiene, 5,7-dimethylocta-1,6-diene, 3,7-dimethyl-1,7-octadiene, 7-methylocta-1,6-diene, and dihydromyrcene; an alicyclic diene such as tetrahydroindene, methyltetrahydroindene, dicyclopentadiene, bicyclo[2.2.1]hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene, and 5-vinyl-2-norbornene; and the like. Among these, 1,4-hexadiene, dicyclopentadiene, 5-ethylidene-2-norbornene, and the like are particularly preferable.

Specific examples of the olefin-based rubber include an ethylene-propylene copolymer rubber, an ethylene-1-butene copolymer rubber, an ethylene-1-pentene copolymer rubber, an ethylene-1-hexene copolymer rubber, an ethylene-1-octene copolymer rubber, and the like. Examples of a copolymer rubber that further include a non-conjugated diene unit include an ethylene-propylene-5-ethylidene-2-norbornene copolymer rubber and the like.

The content of the olefin-based rubber in the rubber composition according to one embodiment of the invention may be appropriately selected (determined) taking account of the intended use. The optimum ratio (content) differs depending on the application. For example, when the rubber composition is used for a tire tread, the content of the olefin-based rubber in the rubber composition is 40 to 99 parts by mass, preferably 50 to 99 parts by mass, more preferably 65 to 97 parts by mass, still more preferably 70 to 97 parts by mass, particularly preferably 75 to 97 parts by mass, and most preferably 80 to 95 parts by mass, based on the total content (=100 parts by mass) of the hydrogenated conjugated diene-based polymer and the olefin-based rubber. If the content of the olefin-based rubber is less than 40 parts by mass, it may be difficult to obtain sufficient processability. If the content of the olefin-based rubber exceeds 99 parts by mass, it may be difficult to improve strength and abrasion resistance since the content of the hydrogenated conjugated diene-based polymer is too low.

Cross-linking Agent

A cross-linked rubber according to one embodiment of the invention is produced through a dynamic heat treatment. A cross-linking agent that is used for the dynamic heat treatment is not particularly limited. Note that it is preferable that the cross-linking agent be a compound that can cross-link at least of the hydrogenated conjugated diene copolymer and the olefin-based rubber when subjected to the dynamic heat treatment at a temperature equal to or higher than the melting point of the hydrogenated conjugated diene copolymer or the olefin-based rubber.

Specific examples of the cross-linking agent include an organic peroxide, a phenolic resin, sulfur, a sulfur compound, p-quinone, a p-quinonedioxime derivative, a bismaleimide compound, an epoxy compound, a silane compound, an amino resin, a polyol, a polyamine, a triazine compound, metallic soap, and the like. It is preferable to use at least one cross-linking agent selected from the group consisting of an organic peroxide, a phenolic resin, and sulfur. These cross-linking agents may be used either alone or in combination.

Examples of the organic peroxide include 1,3-bis(t-butylperoxyisopropyl)benzene, 2,5-dimethyl-2,5-bis(t-butylperoxy)hexyne-3, 2,5-dimethyl-2,5-bis(t-butylperoxy)hexene-3, 2,5-dimethyl-2,5-bis(t-butylperoxy)hexane, 2,2'-bis(t-butylperoxy)-p-isopropylbenzene, dicumyl peroxide, di-t-butyl peroxide, t-butyl peroxide, p-menthane peroxide, 1,1-bis(t-butylperoxy)-3,3,5-trimethylcyclohexane, dilauroyl peroxide, diacetyl peroxide, t-butyl peroxybenzoate, 2,4-dichlorobenzoyl peroxide, p-chlorobenzoyl peroxide, benzoyl peroxide, di(t-butylperoxy) perbenzoate, n-butyl 4,4-bis(t-butylperoxy)valerate, t-butyl peroxyisopropylcarbonate, and the like. Among these, 1,3-bis(t-butylperoxyisopropyl)benzene, 2,5-dimethyl-2,5-di(t-butylperoxy)hexyne-3, 2,5-dimethyl-2,5-di(t-butylperoxy)hexane, α,α-bis(t-butylperoxy)diisopropylbenzene, dicumyl peroxide, and di-t-butyl peroxide are preferable. These organic peroxides may be used either alone or in combination.

Examples of the phenolic resin include a p-substituted phenol-based compound represented by the following general formula (8), an o-substituted phenol-aldehyde condensate, an m-substituted phenol-aldehyde condensate, a brominated alkylphenol-aldehyde condensate, and the like. Among these, the p-substituted phenol-based compound is preferable. These phenolic resins may be used either alone or in combination.

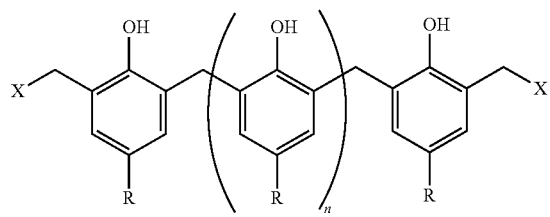

(8)

In the general formula (8), X is a hydroxyl group, an alkyl halide group, or a halogen atom, R is a saturated hydrocarbon group having 1 to 15 carbon atoms, and n is an integer from 0 to 10. Note that the p-substituted phenol-based compound may be obtained by subjecting a p-substituted phenol and an aldehyde (preferably formaldehyde) to a condensation reaction in the presence of an alkali catalyst.

Examples of a commercially-available product of the phenolic resin include Tackirol 201 (alkylphenol-formaldehyde resin, manufactured by Taoka Chemical Co., Ltd.), Tackirol 250-1 (brominated alkylphenol-formaldehyde resin (bromination rate: 4%), manufactured by Taoka Chemical Co., Ltd.), Tackirol 250-III (brominated alkylphenol-formaldehyde resin, manufactured by Taoka Chemical Co., Ltd.), PR-4507 (manufactured by Gunei Chemical Industry Co., Ltd.), ST137X (manufactured by Rohm and Haas), Sumilite Resin PR-22193 (manufactured by Sumitomo Durez Co., Ltd.), Tamanol 531 (manufactured by Arakawa Chemical Industries, Ltd.), SP1059, SP1045, SP1055, SP1056 (manufactured by Schenectady International, Inc.), and CRM-0803 (manufactured by Showa Union Gosei Co., Ltd.). Among these, Tackirol 201 is preferable.

The cross-linking agent is preferably used in a ratio of 0.01 to 20 parts by mass, more preferably 0.1 to 15 parts by mass, and still more preferably 1 to 10 parts by mass, based on 100 parts by mass (in total) of the hydrogenated conjugated diene-based polymer and the olefin-based rubber included in the rubber composition used to produce the cross-linked rubber.

When using the organic peroxide as the cross-linking agent, the organic peroxide is preferably used in a ratio of 0.05 to 10 parts by mass, and more preferably 0.1 to 5 parts by mass, based on 100 parts by mass (in total) of the hydrogenated conjugated diene-based polymer and the olefin-based rubber included in the rubber composition used to produce the cross-linked rubber. If the organic peroxide is used in a ratio of more than 10 parts by mass, the degree of cross-linking may increase excessively, whereby deterioration in formability may occur, and the mechanical properties of the resulting cross-linked rubber may deteriorate. If the organic peroxide is used in a ratio of less than 0.05 parts by mass, the degree of cross-linking may be insufficient, whereby the rubber elasticity and the mechanical strength of the resulting cross-linked rubber may deteriorate.

When using the phenolic resin as the cross-linking agent, the phenolic resin is preferably used in a ratio of 0.2 to 10 parts by mass, and more preferably 0.5 to 5 parts by mass, based on 100 parts by mass (in total) of the hydrogenated conjugated diene-based polymer and the olefin-based rubber included in the rubber composition used to produce the cross-linked rubber. If the phenolic resin is used in a ratio of more than 10 parts by mass, deterioration in formability may occur. If the phenolic resin is used in a ratio of less than 0.2 parts by mass, the degree of cross-linking may be insufficient, whereby the rubber elasticity and the mechanical strength of the resulting cross-linked rubber may deteriorate.

When using sulfur as the cross-linking agent, sulfur is preferably used in a ratio of 0.1 to 5 parts by mass, and more preferably 0.5 to 3 parts by mass, based on 100 parts by mass (in total) of the hydrogenated conjugated diene-based polymer and the olefin-based rubber included in the rubber composition used to produce the cross-linked rubber.

It is preferable to use either or both of a cross-linking assistant and a cross-linking accelerator together with the cross-linking agent since it is possible to effect a mild cross-linking reaction, and form uniform cross-links. When using the organic peroxide as the cross-linking agent, it is preferable to use sulfur, a sulfur compound (e.g., sulfur powder, colloidal sulfur, precipitated sulfur, insoluble sulfur, surface-treated sulfur, or dipentamethylenethiuram tetrasulfide), an oxime compound (e.g., p-quinoneoxime or p,p'-dibenzoylquinoneoxime), a polyfunctional monomer (e.g., ethylene glycol di(meth)acrylate, diethylene glycol di(meth)

acrylate, triethylene glycol di(meth)acrylate, tetraethylene glycol di(meth)acrylate, polyethylene glycol di(meth)acrylate, trimethylolpropane tri(meth)acrylate, diallyl phthalate, tetraallyloxyethane, triallyl cyanurate, N,N'-m-phenylenebismaleimide, N,N'-toluylenebismaleimide, maleic anhydride, divinylbenzene, or zinc di(meth)acrylate), or the like as the cross-linking assistant. Among these, p,p'-dibenzoylquinoneoxime, N,N'-m-phenylenebismaleimide, and divinylbenzene are preferable. These cross-linking assistants may be used either alone or in combination. Note that N,N'-m-phenylenebismaleimide also functions as a cross-linking agent, and may be used alone as the cross-linking agent.

When using the organic peroxide as the cross-linking agent, the cross-linking assistant is preferably used in a ratio of 10 parts by mass or less, and more preferably 0.2 to 5 parts by mass, based on 100 parts by mass (in total) of the hydrogenated conjugated diene-based polymer and the olefin-based rubber included in the mixture. If the cross-linking assistant is used in a ratio of more than 10 parts by mass, the degree of cross-linking may increase excessively, whereby deterioration in formability may occur, and the mechanical properties of the resulting cross-linked rubber may deteriorate.

When using the phenolic resin as the cross-linking agent, it is preferable to use a metal halide (e.g., stannous chloride or ferric chloride), an organic halide (e.g., chlorinated polypropylene, brominated butyl rubber, or chloroprene rubber), or the like as the cross-linking accelerator since it is possible to control the cross-linking rate. It is more preferable to use a dispersant such as a metal oxide (e.g., zinc oxide) or stearic acid in addition to the cross-linking accelerator.

Cross-linking Step

When producing a rubber formed article using the rubber composition according to one embodiment of the invention, the rubber composition is normally formed to have a given shape. After the addition of a cross-linking agent and an optional cross-linking assistant, the hydrogenated conjugated diene-based polymer and the olefin-based rubber are cross-linked. A rubber formed article according to one embodiment of the invention is obtained by cross-linking the hydrogenated conjugated diene-based polymer and the olefin-based rubber included in the rubber composition according to one embodiment of the invention using the cross-linking agent. For example, the rubber composition is normally formed to have a given shape, and subjected to cross-linking with heating to produce the rubber formed article according to one embodiment of the invention. The rubber formed article may be produced using an ordinary method. For example, the rubber composition is mixed using a mixing device (e.g., roll or mixer), formed to have a given shape, and vulcanized using an ordinary method to form a tread or a sidewall rubber to obtain a pneumatic tire. Note that the cross-linking agent and the cross-linking assistant mentioned above may be used as the cross-linking agent and the cross-linking assistant.

The rubber composition according to one embodiment of the invention may include an additional rubber component in addition to the hydrogenated conjugated diene-based polymer and the olefin-based rubber as long as the advantageous effects of the invention are not impaired. The additional rubber component is not particularly limited. Examples of the additional rubber component include a butadiene rubber (BR) (e.g., high-cis BR having a cis-1,4 bond content of 90% or more, and syndiotactic 1,2-polybutadiene (SPB)-containing BR), a styrene-butadiene rubber (SBR), a natural rubber (NR), an isoprene rubber (IR), a styrene-isoprene copolymer rubber, a butadiene-isoprene copolymer rubber, and the like. Among these, BR and SBR are preferable.

The rubber composition according to one embodiment of the invention may include an additional resin component. The additional resin component is not particularly limited. Examples of the additional resin component include a polyolefin-based resin such as polyethylene and polypropylene, and the like.

The rubber composition according to one embodiment of the invention may include a reinforcing filler (e.g., carbon black, silica, clay, and calcium carbonate) as a filler. It is preferable to use either or both of carbon black and silica. Silica is preferable from the viewpoint of the static/dynamic ratio, and carbon black is preferable from the viewpoint of the strength of the rubber composition and the cross-linked rubber. Examples of the silica include wet process silica (hydrated silica), dry process silica (silicic anhydride), colloidal silica, and the like. Among these, wet process silica is preferable. Examples of the carbon black include furnace black, acetylene black, thermal black, channel black, graphite, and the like. Among these, furnace black is preferable.

The filler may be used in an appropriate amount taking account of the intended use. For example, the filler is used in a ratio of 5 to 150 parts by mass based on 100 parts by mass of the rubber component included in the rubber composition. When using silica and carbon black in combination, silica and carbon black are preferably used in a ratio (in total) of 20 to 130 parts by mass, and more preferably 25 to 110 parts by mass, based on 100 parts by mass (in total) of the rubber component included in the rubber composition.

The rubber composition according to one embodiment of the invention may further include various additives that are normally used for a rubber composition that is used to produce a cross-linked rubber used for various applications (e.g., tire, hose, vibration-proofing member, and belt). Examples of the additives include an antioxidant, zinc oxide, stearic acid, a softener, sulfur, a vulcanization accelerator, and the like.

A cross-linked rubber produced using the rubber composition according to one embodiment of the invention exhibits high strength, and may be applied to various rubber formed articles. More specifically, the cross-linked rubber may be used as a material for producing a tire tread and a sidewall; a vibration-proofing rubber used for an industrial machine and equipment; a hose and a hose cover such as a diaphragm, a roll, a radiator hose, and an air hose; a seal such as packing, a gasket, a weatherstrip, an O-ring, and an oil seal; a belt such as a power transmission belt; a lining and a dust boot; and the like. The cross-linked rubber may suitably be used as a tire member, a vibration-proofing member, and a belt member. The cross-linked rubber is particularly suitable as a tire member since the cross-linked rubber exhibits high strength, high abrasion resistance, and good low hysteresis loss properties.

EXAMPLES

The invention is further described below by way of examples. Note that the invention is not limited to the following examples. The units "parts" and "%" used in connection with the examples and the comparative examples respectively refer to "parts by mass" and "mass %" unless otherwise indicated. The property values were measured using the methods described later.

Examples and Comparative Examples of Production of Hydrogenated Conjugated Diene-based Polymer Production of Hydrogenation Catalyst A hydrogenation catalyst (catalyst A) was produced as described below.

Production Example 1

Catalyst A

A three-necked flask (volume: 1 L) equipped with a stirrer and a dropping funnel in which the internal atmosphere had been replaced by dry nitrogen, was charged with 200 mL of anhydrous tetrahydrofuran and 0.2 mol of tetrahydrofurfuryl alcohol. An n-butyllithium (hereinafter may be referred to as "n-BuLi")/cyclohexane solution (0.2 mol) was added dropwise to the three-necked flask at 15° C. to effect a reaction to obtain a tetrahydrofuran solution of tetrahydrofurfuryloxylithium.

A three-necked flask (volume: 1 L) equipped with a stirrer and a dropping funnel in which the internal atmosphere had been replaced by dry nitrogen, was charged with 49.8 g (0.2 mol) of bis(η5-cyclopentadienyl)titanium dichloride and 250 mL of anhydrous tetrahydrofuran. The tetrahydrofuran solution of tetrahydrofurfuryloxylithium obtained as described above was added dropwise to the mixture at room temperature over about 1 hour with stirring. When about 2 hours had elapsed, the resulting reddish brown solution was filtered, and the insoluble component was washed with dichloromethane.

The filtrate and the washing solution were combined, and the solvent was removed under reduced pressure to obtain a catalyst A (bis(η5-cyclopentadienyl)titanium (tetrahydrofurfuryloxy)chloride) (also referred to as "chlorobis(2,4-cyclopentadienyl)titanium(IV) tetrahydrofurfurylalkoxide"). The yield was 95%.

Example 1

Synthesis and Evaluation of Conjugated Diene-based Rubber A

An autoclave reactor (internal volume: 10 L) in which the internal atmosphere had been replaced by nitrogen, was charged with 5,000 g of cyclohexane, 150.0 g of tetrahydrofuran, 250 g of styrene, and 730 g of 1,3-butadiene. After adjusting the temperature of the mixture in the reactor to 10° C., a cyclohexane solution including n-butyllithium (11.60 mmol) was added to the mixture to initiate polymerization. The polymerization reaction was effected under adiabatic conditions, and the maximum temperature reached 85° C.

20 g of butadiene was added to the mixture when the polymerization conversion ratio had reached 99%, and polymerized for 5 minutes to obtain a reaction mixture including a polymer. 8.5 g of N,N-bis(trimethylsilyl)aminopropylmethyldiethoxysilane was added to the reaction mixture, and reacted with the active site of the polymer for 30 minutes.

After adjusting the temperature of the reaction mixture to 80° C. or more, hydrogen was introduced into the system.

After the addition of 0.32 g of the catalyst A and 0.39 g of tetrachlorosilane, the mixture was reacted for 1 hour while maintaining the hydrogen pressure at 1.0 MPa. After completion of the reaction, the reaction mixture was returned to room temperature and normal pressure, and removed from the reactor to obtain a polymer solution.

A solvent removal tank was charged with an aqueous solution (temperature: 80° C.) of which the pH was adjusted to 8.5 (pH at 80° C. measured using a glass electrode method) using ammonia (pH-adjusting agent). After the addition of the polymer solution (in a ratio of 100 parts by mass based on 200 parts by mass of the aqueous solution), the solvent was removed by steam stripping (temperature of liquid phase in solvent removal tank: 95° C., steam temperature: 190° C., 2 hours), and the residue was dried using a heated roll (temperature: 110° C.) to obtain a conjugated diene-based rubber A.

Table 1 shows the components used to produce the conjugated diene-based rubber A, and Table 2 shows the properties of the conjugated diene-based rubber A. A rubber composition was prepared using the conjugated diene-based rubber A, an olefin-based rubber ("JSR EP51" (ethylene-propylene copolymer rubber) manufactured by JSR Corporation), and the additional components shown in Table 3, and vulcanized, and the properties of the vulcanized rubber composition were evaluated. The results are shown in Table 4.

Example 2

Synthesis and Evaluation of Conjugated Diene-based Rubber B

An autoclave reactor (internal volume: 10 L) in which the internal atmosphere had been replaced by nitrogen, was charged with 5,000 g of cyclohexane, 50.0 g of tetrahydrofuran, and 100 g of isoprene. After adjusting the temperature of the mixture in the reactor to 10° C., a cyclohexane solution including n-butyllithium (11.60 mmol) was added to the mixture to initiate polymerization. The polymerization reaction was effected under adiabatic conditions, and the maximum temperature reached 25° C.

250 g of styrene and 730 g of 1,3-butadiene were then added to the mixture, and polymerized. The polymerization reaction was effected under adiabatic conditions, and the maximum temperature reached 80° C.

20 g of butadiene was added to the mixture when the polymerization conversion ratio had reached 99%, and polymerized for 5 minutes to obtain a reaction mixture including a polymer. 8.5 g of N,N-bis(trimethylsilyl)aminopropylmethyldiethoxysilane was added to the reaction mixture, and reacted with the active site of the polymer for 30 minutes.

After adjusting the temperature of the reaction mixture to 80° C. or more, hydrogen was introduced into the system.

After the addition of 0.32 g of the catalyst A and 0.39 g of tetrachlorosilane, the mixture was reacted for 1 hour while maintaining the hydrogen pressure at 1.0 MPa. After completion of the reaction, the reaction mixture was returned to room temperature and normal pressure, and removed from the reactor to obtain a polymer solution.

A solvent removal tank was charged with an aqueous solution (temperature: 80° C.) of which the pH was adjusted to 8.5 (pH at 80° C. measured using a glass electrode method) using ammonia (pH-adjusting agent). After the addition of the polymer solution (in a ratio of 100 parts by mass based on 200 parts by mass of the aqueous solution), the solvent was removed by steam stripping (temperature of liquid phase in solvent removal tank: 95° C., steam temperature: 190° C., 2 hours), and the residue was dried using a heated roll (temperature: 110° C.) to obtain a conjugated diene-based rubber B.

Table 1 shows the components used to produce the conjugated diene-based rubber B, and Table 2 shows the properties of the conjugated diene-based rubber B. A rubber composition was prepared using the conjugated diene-based rubber B, an olefin-based rubber ("JSR EP51"), and the additional components shown in Table 3, and vulcanized, and the properties of the vulcanized rubber composition were evaluated. The results are shown in Table 4.

Example 3

Synthesis and Evaluation of Conjugated Diene-based Rubber C

An autoclave reactor (internal volume: 10 L) in which the internal atmosphere had been replaced by nitrogen, was charged with 5,000 g of cyclohexane, 50.0 g of tetrahydrofuran, 300 g of styrene, and 680 g of 1,3-butadiene. After adjusting the temperature of the mixture in the reactor to 10° C., a cyclohexane solution including n-butyllithium (11.60 mmol) was added to the mixture to initiate polymerization. The polymerization reaction was effected under adiabatic conditions, and the maximum temperature reached 85° C.

20 g of butadiene was added to the mixture when the polymerization conversion ratio had reached 99%, and polymerized for 5 minutes to obtain a reaction mixture including a polymer. 8.5 g of N,N-bis(trimethylsilyl)aminopropylmethyldiethoxysilane was added to the reaction mixture, and reacted with the active site of the polymer for 30 minutes.

After adjusting the temperature of the reaction mixture to 80° C. or more, hydrogen was introduced into the system.

After the addition of 0.32 g of the catalyst A and 0.39 g of tetrachlorosilane, the mixture was reacted for 1 hour while maintaining the hydrogen pressure at 1.0 MPa. After completion of the reaction, the reaction mixture was returned to room temperature and normal pressure, and removed from the reactor to obtain a polymer solution.

A solvent removal tank was charged with an aqueous solution (temperature: 80° C.) of which the pH was adjusted to 8.5 (pH at 80° C. measured using a glass electrode method) using ammonia (pH-adjusting agent). After the addition of the polymer solution (in a ratio of 100 parts by mass based on 200 parts by mass of the aqueous solution), the solvent was removed by steam stripping (temperature of liquid phase in solvent removal tank: 95° C., steam temperature: 190° C., 2 hours), and the residue was dried using a heated roll (temperature: 110° C.) to obtain a conjugated diene-based rubber C.

Table 1 shows the components used to produce the conjugated diene-based rubber C, and Table 2 shows the properties of the conjugated diene-based rubber C. A rubber composition was prepared using the conjugated diene-based rubber C, an olefin-based rubber ("JSR EP51"), and the additional components shown in Table 3, and vulcanized, and the properties of the vulcanized rubber composition were evaluated. The results are shown in Table 4.

Comparative Example 1

Synthesis and Evaluation of Conjugated Diene-based Rubber S

An autoclave reactor (internal volume: 5 L) in which the internal atmosphere had been replaced by nitrogen, was charged with 2,750 g of cyclohexane, 50.0 g of tetrahydrofuran, 125 g of styrene, and 365 g of 1,3-butadiene. After adjusting the temperature of the mixture included in the reactor to 10° C., a cyclohexane solution including n-butyllithium (5.80 mmol) was added to the mixture to initiate polymerization. The polymerization reaction was effected under adiabatic conditions, and the maximum temperature reached 85° C.

10 g of butadiene was added to the mixture when the polymerization conversion ratio had reached 99%, and polymerized for 5 minutes. 2.0 g of 2,6-di-tert-butyl-p-cresol was added to the resulting polymer solution. The solvent was removed by performing steam stripping using hot water (of which the pH was adjusted to 9 using sodium hydroxide), and the rubber was dried using a heated roll (temperature: 110° C.) to obtain a conjugated diene-based rubber S.

Table 1 shows the components used to produce the conjugated diene-based rubber S, and Table 2 shows the properties of the conjugated diene-based rubber S. A rubber composition was prepared using the conjugated diene-based rubber S and the additional components shown in Table 3, and vulcanized, and the properties of the vulcanized rubber composition were evaluated. The results are shown in Table 4.

TABLE 1

|  | Example 1 | Example 2 | Example 3 | Comparative Example 1 |
|---|---|---|---|---|
| Type of (modified) conjugated diene-based rubber | A | B | C | S |
| Components |  |  |  |  |
| Solvent |  |  |  |  |
| Cyclohexane (g) | 5000 | 5000 | 5000 | 2750 |
| Vinyl content modifier |  |  |  |  |
| Tetrahydrofuran (g) | 150.0 | 50.0 | 50.0 | 50.0 |
| Monomer |  |  |  |  |
| Isoprene (g) | — | 100 | — | — |
| Styrene (g) | 250 | 250 | 300 | 125 |
| Butadiene (g) | 730 | 730 | 680 | 365 |
| Additional butadiene (g) | 20 | 20 | 20 | 10 |
| Initiator |  |  |  |  |
| n-Butyllithium (mmol) | 11.60 | 11.60 | 11.60 | 5.80 |
| Amine-based modifier |  |  |  |  |
| N—Si-1*[1] (g) | 8.5 | 8.5 | 8.5 | — |

*[1]N,N-Bis(trimethylsilyl)aminopropylmethyldiethoxysilane

Bound styrene content (%): The bound styrene content (%) was determined by $^1$H-NMR (500 MHz).

1,2-Vinyl content (%): The 1,2-vinyl content (%) was determined by $^1$H-NMR (500 MHz).

Glass transition temperature (° C.): The glass transition temperature (° C.) was measured in accordance with ASTM D3418.

Molecular weight before modification: The molecular weight (polystyrene-equivalent molecular weight) before modification was determined from the retention time that corresponds to the vertex of the maximum peak of the GPC curve obtained by gel permeation chromatography (GPC) (that was implemented using a system "HLC-8120GPC" manufactured by Tosoh Corporation) under the following conditions.
GPC Conditions
Column: GMHXL (manufactured by Tosoh Corporation) (×2)
Column temperature: 40° C.
Mobile phase: tetrahydrofuran
Flow rate: 1.0 mL/min
Sample concentration: 10 mg/20 mL
Mooney viscosity (ML1+4, 100° C.): The Mooney viscosity (ML1+4, 100° C.) was measured in accordance with JIS K 6300 using an L rotor (preheating time: 1 minute, rotor operation time: 4 minutes, temperature: 100° C.).
Cold flow value: The copolymer was held at 50° C., and extruded from an orifice (diameter: 6.35 mm) under a pressure of 24.1 kPa. The amount (mg) of the copolymer extruded was measured every 30 minutes over 90 minutes after 10 minutes had elapsed from the start of extrusion (after the extrusion speed had become constant), and the average value thereof was taken as the cold flow value (mg/min). A large cold flow value indicates that the shape stability of the rubber is poor, and handling is difficult.
Hydrogenation rate (%): The hydrogenation rate (%) was determined by $^1$H-NMR (500 MHz).
Styrene long-chain ratio (mass %): The styrene long-chain ratio θst (i.e., the ratio of a chain that is composed of eight or more consecutive structural units derived from styrene to the total structural units derived from styrene included in the polymer) was calculated as described below. The ratio of the integral value Σ(a) within the chemical shift range (a) to the sum Σ(a, b, c) of the integral values respectively within the chemical shift ranges (a) to (c) in the $^1$H-NMR spectrum (500 MHz) measured using deuterated chloroform as a solvent is calculated, multiplied by 2.5, and taken as the styrene long-chain ratio θst (see the following expression (1)).
(a) A chain of eight or more consecutive structural units derived from styrene: 6.00≤S≤6.68
(b) A chain of 2 to 7 consecutive structural units derived from styrene: 6.68≤S≤6.89
(c) A short chain derived from styrene: 6.89≤S≤8.00

$$\theta st(wt\%) = (\Sigma(a)/\Sigma(a,b,c)) \times 2.5 \quad (1)$$

TABLE 2

| | Example 1 | Example 2 | Example 3 | Comparative Example 1 |
|---|---|---|---|---|
| Type of (modified) conjugated diene-based rubber | A | B | C | S |
| Properties of (modified) conjugated diene-based rubber | | | | |
| Bound styrene content (mass %) | 25 | 25 | 30 | 25 |
| Styrene long-chain ratio (mass %) | 2.9 | 2.8 | 3.6 | 2.9 |
| Vinyl content (%) | 58 | 32 | 32 | 56 |
| Glass transition temperature (° C.) | −30 | −42 | −40 | −46 |
| Weight average molecular weight (×10$^4$) | 19 | 19 | 20 | 20 |
| Mooney viscosity (ML1 + 4, 100° C.) | 65 | 98 | 100 | 63 |
| Cold flow value (mg/min) | 0.2 | 0.1 | 0.1 | 0.2 |
| Hydrogenation rate (%) | 95 | 95 | 95 | 0 |

TABLE 3

| Composition (phr) | I | II | III |
|---|---|---|---|
| (Modified) conjugated diene-based rubber | 75 | 50 | 25 |
| Olefin-based rubber*[1] | 25 | 50 | 75 |
| Silica*[4] | 70 | 70 | 70 |
| Silane coupling agent*[5] | 5.6 | 5.6 | 5.6 |
| Stearic acid | 2.0 | 2.0 | 2.0 |
| Antioxidant*[6] | 1.0 | 1.0 | 1.0 |
| Zinc oxide | 3.0 | 3.0 | 3.0 |
| Vulcanization accelerator CZ*[7] | 1.8 | 1.8 | 1.8 |
| Vulcanization accelerator D*[8] | 1.5 | 1.5 | 1.5 |
| Sulfur | 1.5 | 1.5 | 1.5 |

*[1]EP51 manufactured by JSR Corporation
*[4]Nipsil AQ manufactured by Tosoh Silica Corporation
*[5]SI 69 manufactured by Evonik
*[6]Nocrac 810NA manufactured by Ouchi Shinko Chemical Industrial Co., Ltd.
*[7]Nocceler CZ manufactured by Ouchi Shinko Chemical Industrial Co., Ltd.
*[8]Nocceler D manufactured by Ouchi Shinko Chemical Industrial Co., Ltd.

TABLE 4

| | Example 1 | Example 1 | Example 1 | Example 2 | Example 2 | Example 2 | Example 3 | Example 3 | Example 3 | Comparative Example 1 |
|---|---|---|---|---|---|---|---|---|---|---|
| Type of (modified) conjugated diene-based rubber | A | A | A | B | B | B | C | C | C | S |
| Properties of cross-linked rubber composition | | | | | | | | | | |
| Composition | I | II | III | I | II | III | I | II | III | II |
| Mooney viscosity (ML1 + 4, 100° C.) | 134 | 105 | 81 | 162 | 120 | 93 | 165 | 121 | 94 | 73 |
| Tensile strength (index) | 156 | 132 | 115 | 188 | 143 | 121 | 202 | 151 | 129 | 100 |
| 0° C. tanδ (index) | 110 | 105 | 103 | 108 | 103 | 100 | 111 | 106 | 103 | 100 |
| 70° C. tanδ (index) | 123 | 105 | 95 | 128 | 110 | 101 | 122 | 108 | 100 | 100 |
| Abrasion resistance (index) | 135 | 155 | 130 | 145 | 183 | 150 | 147 | 201 | 157 | 100 |

Rubber Composition Kneading Method and Evaluation of Properties

The modified conjugated diene-based rubber, a butadiene rubber, a natural rubber, an extender oil, carbon black, silica, a silane coupling agent, stearic acid, an antioxidant, and zinc oxide were kneaded using a plastomill (internal volume: 250 cc) equipped with a temperature controller at a filling ratio of 72% and a rotational speed of 60 rpm (first-step kneading). After cooling the mixture to room temperature, sulfur and a vulcanization accelerator were added to the mixture, and the resulting mixture was kneaded (second-step kneading). The mixture was then formed, and vulcanized at 160° C. for a given time using a vulcanizing press, and the properties (that represent the tire performance) of the pre-vulcanized and vulcanized product were evaluated as described below.

(i) Mooney viscosity: The rubber composition that was not vulcanized was used as a measurement specimen. The Mooney viscosity of the measurement specimen was measured in accordance with JIS K 6300-1 using an L rotor (preheating time: 1 minute, rotor operation time: 4 minutes, temperature: 100° C.).

(ii) Tensile strength: The 300% modulus was measured in accordance with JIS K 6301. A large 300% modulus value (index) indicates that the tensile strength is high, and thus is better.

(iii) 0° C. tanδ: The vulcanized rubber was used as a measurement specimen. The 0° C. tanδ value of the measurement specimen was measured using a dynamic spectrometer (manufactured by Rheometrics (U.S.A.)) (dynamic tensile strain: 0.14%, angular velocity: 100 radians per second, temperature: 0° C.). A large 0° C. tanδ value (index) indicates that the wet skid resistance is high, and thus is better.

(iv) 70° C. tanδ: The vulcanized rubber was used as a measurement specimen. The 70° C. tanδ value of the measurement specimen was measured using a dynamic spectrometer (manufactured by Rheometrics (U.S.A.)) (dynamic tensile strain: 0.7%, angular velocity: 100 radians per second, temperature: 70° C.). A large 70° C. tanδ value (index) indicates that the low hysteresis loss properties are good.

(v) Abrasion resistance: The vulcanized rubber was used as a measurement specimen. The abrasion resistance of the measurement specimen was measured in accordance with JIS K 6264 using a DIN abrasion tester (manufactured by Toyo Seiki Seisaku-Sho, Ltd.) (load: 10 N, temperature: 25° C.). A large abrasion resistance value (index) indicates that the abrasion resistance is high.

As is clear from the results shown in Table 4, the rubber compositions prepared using the modified hydrogenated conjugated diene-based rubber and the olefin-based rubber exhibited significantly improved tensile strength and abrasion resistance while maintaining a good balance between wet skid resistance and low hysteresis loss properties. It was found from the property evaluation results for the conjugated diene-based rubber S of Comparative Example 1, that the modification step and the hydrogenation step are important for improving the tensile strength and the abrasion resistance of the cross-linked rubber.

INDUSTRIAL APPLICABILITY

The invention may suitably be applied to a tire member, a hose, a vibration-proofing member, a power transmission belt, and the like.

The invention claimed is:

1. A cross-linked rubber obtained by cross-linking a rubber composition that comprises a hydrogenated conjugated diene-based polymer, an olefin-based rubber, and a cross-linking agent,
wherein the hydrogenated conjugated diene-based polymer is a hydrogenated product of a polymer that comprises a structural unit derived from butadiene, and a hydrocarbyloxysilyl group of formula (1) at one terminal or each terminal, wherein the terminal of the polymer at which the hydrocarbyloxysilyl group is bonded is a butadiene block:

wherein $A^1$ is a monovalent functional group that includes a nitrogen atom, does not include active hydrogen, and is bonded to $R^5$ through the nitrogen atom, $R^3$ and $R^4$ are each independently a linear or branched alkyl group having 1 to 20 carbon atoms, a cycloalkyl group having 3 to 20 carbon atoms, or an aryl group having 6 to 20 carbon atoms, $R^5$ is a linear or branched alkanediyl group having 1 to 20 carbon atoms, a cycloalkylene group having 3 to 20 carbon atoms, or an arylene group having 6 to 20 carbon atoms, and n is an integer from 0 to 2.

2. The cross-linked rubber according to claim 1, wherein the structural unit derived from butadiene that is comprised in the hydrogenated conjugated diene-based polymer has a hydrogenation rate of 70% or more.

3. The cross-linked rubber according to claim 1, wherein the hydrogenated conjugated diene-based polymer comprises a random copolymer part that is formed of the structural unit derived from butadiene and a structural unit derived from an aromatic vinyl compound.

4. The cross-linked rubber according to claim 1, wherein a content of a chain that comprises eight or more consecutive structural units derived from an aromatic vinyl compound in the hydrogenated conjugated diene-based polymer is 10 mass % or less based on a total content of the structural units derived from the aromatic vinyl compound.

5. The cross-linked rubber according to claim 3, wherein the aromatic vinyl compound is one or more compounds selected from styrene and α-methylstyrene.

6. The cross-linked rubber according to claim 1, wherein the hydrogenated conjugated diene-based polymer further comprises a structural unit derived from a conjugated diene-based compound other than butadiene.

7. The cross-linked rubber according to claim 6, wherein the conjugated diene-based compound other than butadiene is isoprene.

8. The cross-linked rubber according to claim 1, wherein the hydrogenated conjugated diene-based polymer comprises a polyisoprene block.

9. The cross-linked rubber according to claim 8, wherein a 1,4-bond/3,4-bond ratio in the polyisoprene block is 60/40 to 98/2.

10. The cross-linked rubber according to claim 1, wherein the hydrogenated conjugated diene-based polymer is a polymer produced by polymerizing monomers that comprise 50 to 90 parts by mass of butadiene, 10 to 50 parts by mass of an aromatic vinyl compound, and 0 to 40 parts by mass of a conjugated diene-based compound other than butadiene.

11. The cross-linked rubber according to claim 1, wherein the structural unit derived from butadiene that is comprised in the hydrogenated conjugated diene-based polymer has a 1,2-vinyl content of 5 to 70%.

12. The cross-linked rubber according to claim 1, wherein the rubber composition further comprises one or more additional components selected from silica and carbon black.

13. A tire member comprising the cross-linked rubber according to claim 1.

14. A vibration-proofing member comprising the cross-linked rubber according to claim 1.

15. A belt member comprising the cross-linked rubber according to claim 1.

16. A rubber composition comprising a hydrogenated conjugated diene-based polymer and an olefin-based rubber, wherein the hydrogenated conjugated diene-based polymer is a hydrogenated product of a polymer that comprises a structural unit derived from butadiene and a hydrocarbyloxysilyl group at one terminal or each terminal, wherein the terminal of the polymer at which the hydrocarbyloxysilyl group is bonded is a butadiene block:

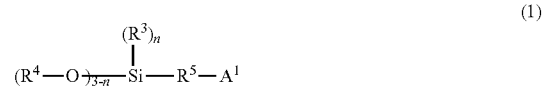

wherein $A^1$ is a monovalent functional group that includes a nitrogen atom, does not include active hydrogen, and is bonded to $R^5$ through the nitrogen atom, $R^3$ and $R^4$ are each independently a linear or branched alkyl group having 1 to 20 carbon atoms, a cycloalkyl group having 3 to 20 carbon atoms, or an aryl group having 6 to 20 carbon atoms, $R^5$ is a linear or branched alkanediyl group having 1 to 20 carbon atoms, a cycloalkylene group having 3 to 20 carbon atoms, or an arylene group having 6 to 20 carbon atoms, and n is an integer from 0 to 2.

* * * * *